US012597434B2

(12) United States Patent
Sun et al.

(10) Patent No.: US 12,597,434 B2
(45) Date of Patent: Apr. 7, 2026

(54) CONTROL OF SPEECH PRESERVATION IN SPEECH ENHANCEMENT

(71) Applicant: Dolby Laboratories Licensing Corporation, San Francisco, CA (US)

(72) Inventors: Jundai Sun, Beijing (CN); Lie Lu, Dublin, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 153 days.

(21) Appl. No.: 18/706,798

(22) PCT Filed: Nov. 8, 2022

(86) PCT No.: PCT/US2022/049193

§ 371 (c)(1),
(2) Date: May 2, 2024

(87) PCT Pub. No.: WO2023/086311

PCT Pub. Date: May 19, 2023

(65) Prior Publication Data

US 2025/0037729 A1 Jan. 30, 2025

Related U.S. Application Data

(60) Provisional application No. 63/364,661, filed on May 13, 2022, provisional application No. 63/289,846, filed on Dec. 15, 2021.

(30) Foreign Application Priority Data

Nov. 9, 2021 (WO) ................ PCT/CN2021/129573

(51) Int. Cl.
*G10L 21/0232* (2013.01)
*G10L 25/30* (2013.01)

(52) U.S. Cl.
CPC .......... *G10L 21/0232* (2013.01); *G10L 25/30* (2013.01)

(58) Field of Classification Search
CPC ............. G10L 21/0264; G10L 21/0232; G10L 15/1822; G10L 15/22; G10L 25/06;
(Continued)

(56) References Cited

U.S. PATENT DOCUMENTS 8,355,914 B2 * 1/2013 Joh ....................... G06F 40/232
400/489
9,412,356 B1 * 8/2016 Baker .............. G10K 11/17855
(Continued)

FOREIGN PATENT DOCUMENTS

AU 2011258531 A1 * 10/2012 ............ G10L 15/30
AU 2021340886 A1 * 3/2023 ............ G16B 20/20
(Continued)

OTHER PUBLICATIONS

A Unified Speaker-Dependent Speech Separation And Enhancement System Based on Deep Neural Networks (Year: 2015).*
(Continued)

*Primary Examiner* — Mohammad K Islam

(57) ABSTRACT

A method for performing denoising on audio signals is provided. In some implementations, the method involves determining an aggressiveness control parameter value that modulates a degree of speech preservation to be applied. In some implementations, the method involves obtaining a training set of training samples, a training sample having a noisy audio signal and a target denoising mask. In some implementations, the method involves training a machine learning model, wherein the trained machine learning model is usable to take, as an input, a noisy test audio signal and generate a corresponding denoised test audio signal, and wherein the aggressiveness control parameter value is used (Continued)

for: 1) generating a frequency domain representation of the noisy audio signals included in the training set; 2) modifying the target denoising masks; 3) determining an architecture of the machine learning model; or 4) determining a loss during training of the machine learning model.

19 Claims, 7 Drawing Sheets

(58) Field of Classification Search
CPC ... G10L 25/60; G10L 25/30; G10L 2015/088; G10L 2021/02082
See application file for complete search history.

(56) References Cited

U.S. PATENT DOCUMENTS

| | | | | |
|---|---|---|---|---|
| 9,524,730 | B2 | 12/2016 | Wang | |
| 9,805,716 | B2 | 10/2017 | Lee | |
| 10,147,442 | B1* | 12/2018 | Panchapagesan | G10L 15/063 |
| 10,347,271 | B2 | 7/2019 | Nesta | |
| 10,529,358 | B2* | 1/2020 | Jackson | G10K 11/17821 |
| 10,573,296 | B1* | 2/2020 | Arel | G10L 15/063 |
| 10,602,268 | B1* | 3/2020 | Soto | H04R 3/005 |
| 10,614,827 | B1* | 4/2020 | Korjani | G10L 21/0364 |
| 10,672,414 | B2 | 6/2020 | Tashev | |
| 10,818,309 | B2 | 10/2020 | Lee | |
| 10,966,034 | B2 | 3/2021 | Andersen | |
| 11,210,461 | B2* | 12/2021 | Thomson | G10L 15/22 |
| 11,218,796 | B2* | 1/2022 | Klimanis | G10L 25/84 |
| 11,741,934 | B1* | 8/2023 | Zhang | G10L 21/0208 381/71.11 |
| 2014/0079261 | A1* | 3/2014 | Short | H04R 25/50 381/317 |
| 2014/0301569 | A1* | 10/2014 | Every | H04R 3/04 381/103 |
| 2014/0341388 | A1* | 11/2014 | Goldstein | G10K 11/17827 381/71.11 |
| 2015/0179184 | A1* | 6/2015 | Cudak | G10L 21/0208 704/233 |
| 2015/0264499 | A1* | 9/2015 | Valeri | H04S 7/302 381/58 |
| 2016/0125892 | A1* | 5/2016 | Bowen | G10L 15/20 704/226 |
| 2016/0196108 | A1* | 7/2016 | Selig | H03G 5/165 700/94 |
| 2016/0275936 | A1* | 9/2016 | Thorn | G10L 15/063 |
| 2016/0360327 | A1* | 12/2016 | Ungstrup | H04R 25/554 |
| 2017/0061978 | A1 | 3/2017 | Wang | |
| 2017/0148466 | A1* | 5/2017 | Jackson | G10L 15/20 |
| 2017/0213550 | A1* | 7/2017 | Ali | G10L 15/20 |
| 2017/0374478 | A1* | 12/2017 | Jones | G10L 21/0364 |
| 2018/0233165 | A1* | 8/2018 | Atkinson | G06F 3/165 |
| 2018/0315413 | A1* | 11/2018 | Lee | B60L 1/00 |
| 2018/0350383 | A1* | 12/2018 | Moghimi | G10L 21/0364 |
| 2019/0147853 | A1* | 5/2019 | Gunasekara | G06N 3/0442 704/243 |
| 2019/0206417 | A1* | 7/2019 | Woodruff | G10L 21/028 |
| 2019/0208317 | A1* | 7/2019 | Woodruff | G10L 21/0272 |
| 2019/0259381 | A1* | 8/2019 | Ebenezer | H04R 3/005 |
| 2019/0318755 | A1* | 10/2019 | Tashev | G06N 3/045 |
| 2019/0339926 | A1* | 11/2019 | Wahlberg | G10L 25/51 |
| 2020/0022007 | A1* | 1/2020 | Ouyang | G10L 15/26 |
| 2020/0296510 | A1* | 9/2020 | Li | H04R 1/1083 |
| 2020/0335084 | A1* | 10/2020 | Wang | G10L 21/0364 |
| 2021/0035561 | A1* | 2/2021 | D'Amato | A61N 1/3756 |
| 2021/0074266 | A1 | 3/2021 | Lu | |
| 2021/0225383 | A1 | 7/2021 | Takahashi | |
| 2021/0360349 | A1* | 11/2021 | Nyayate | G06N 3/044 |
| 2022/0084539 | A1* | 3/2022 | Kagoshima | G10L 25/03 |
| 2022/0223144 | A1 | 7/2022 | Sun | |
| 2022/0246161 | A1* | 8/2022 | Verbeke | G10L 21/034 |
| 2022/0343080 | A1* | 10/2022 | Cohen | G06F 40/30 |
| 2022/0392435 | A1* | 12/2022 | Saadatpanah | G06F 16/686 |
| 2024/0196145 | A1* | 6/2024 | Faubel | H04R 1/08 |
| 2024/0242705 | A1* | 7/2024 | Wang | G10L 13/047 |
| 2024/0296859 | A1* | 9/2024 | Mohammadi | G10L 15/063 |
| 2025/0182739 | A1* | 6/2025 | Nguyen Cong | G10L 13/08 |

FOREIGN PATENT DOCUMENTS

| | | | | | |
|---|---|---|---|---|---|
| CN | 106782504 | A * | 5/2017 | G10L 21/0208 |
| CN | 111833897 | A * | 10/2020 | G10L 21/0232 |
| CN | 112786006 | A * | 5/2021 | G10L 13/04 |
| CN | 110491407 | B * | 9/2021 | G10L 21/0232 |
| CN | 113593594 | A * | 11/2021 | G10L 25/30 |
| CN | 113990343 | A * | 1/2022 | H04N 7/15 |
| CN | 110808061 | B * | 3/2022 | G10L 21/0224 |
| CN | 112786006 | B * | 5/2024 | G10L 13/04 |
| DE | 102013216427 | A1 * | 3/2015 | G10L 15/30 |
| JP | H0827638 | B2 * | 3/1996 | |
| KR | 20170106312 | A * | 9/2017 | G10L 21/0364 |
| WO | WO-2016117793 | A1 * | 7/2016 | G10L 21/0364 |
| WO | WO-2020068056 | A1 * | 4/2020 | G10L 15/16 |
| WO | WO-2022040011 | A1 * | 2/2022 | H04R 1/1083 |
| WO | 2022087009 | A1 | 4/2022 | |
| WO | 2022087025 | A1 | 4/2022 | |
| WO | WO-2022151930 | A1 * | 7/2022 | G10L 13/10 |
| WO | WO-2022151931 | A1 * | 7/2022 | G10L 13/04 |

OTHER PUBLICATIONS

A Regression approach to speech Enhancement Based on Deep Neural Networks (Year: 2015).*
Target Speech Signal Enhancement Based on Deep Neural Networks (Year: 2019).*
Interactive Speech and Noise Modeling for Speech Enhancement (Year: 2021).*
Leng Xin et al: "On the compromise between noise reduction and speech/noise spatial information preservation in binaural speech Enhancement", A the Journal of the Acoustical Society of America, American Institute of Physics, 2 Huntington Quadrangle, Melville, NY 11747, vol. 149, No. 5, May 10, 2021 (May 10, 2021), pp. 3151-3162, XP012256339, ISSN: 0001-4966, DOI: 10.1121/10.0004854 [retrieved on May 10, 2021] abstract.
Narayanan Arun et al: "Ideal ratio mask estimation using deep neural networks for robust speech recognition", ICASSP, IEEE International Conference on Acoustics, Speech and Signal Processing—Proceedings 1999 IEEE, IEEE, May 26, 2013 (May 26, 2013), pp. 7092-7096, XP032508424, ISSN: 1520-6149, DOI: 10.1109/ICASSP.2013.6639038 ISBN: 978-0-7803-5041-0 [retrieved on Oct. 18, 2013] abstract.
O. Ronneberger et al., "U-net: Convolutional networks for biomedical image segmentation," in International Conference on Medical image computing and computer-assisted intervention. Springer, 2015, pp. 234-241.
Shankar et al., "Real-time single-channel deep neural network-based speech enhancement on edge devices," Interspeech. Oct. 2020; pp. 3281-3285, https://doi.org/10.21437/Interspeech.2020-1901.
Wang et al., "Improving the Intelligibility of Speech for Simulated Electric and Acoustic Stimulation Using Fully Convolutional Neural Networks," IEEE Trans Neural Syst Rehabil Eng. 2021; vol. 29 pp. 184-195, https://doi.org/10.1109/TNSRE.2020.3042655.
Xia Yangyang et al: "Weighted Speech 1-19 Distortion Losses for Neural-Network-Based Real-Time Speech Enhancement", ICASSP 2020—2020 IEEE International Conference on Acoustics, Speech and Signal Processing (ICASSP), IEEE, May 4, 2020 (May 4, 2020), pp. 871-875, XP033793934, DOI: 10.1109/ICASSP40776.2020.9054254 [retrieved on Apr. 1, 2020] paragraph 4.3.
Xiaohan Chen, "Unsupervised Speech Denoising Method Based on Deep Neural Network," 2018 11th International Symposium on Computational Intelligence and Design (ISCID); pp. 254-258, https://doi.org/10.1109/ISCID.2018.10159.

* cited by examiner

CONTROL OF SPEECH PRESERVATION IN SPEECH ENHANCEMENT

CROSS REFERENCE TO RELATED APPLICATIONS

This application is a U.S. National Stage Application under U.S.C. 371 of International Application No. PCT/US2022/049193, filed on Nov. 8, 2022 (reference: D21126WO01), which claims priority to International Application No. PCT/CN2021/129573, filed 9 Nov. 2021; and U.S. provisional application 63/289,846, filed 15 Dec. 2021; and U.S. provisional application 63/364,661, filed 13 May 2022, all of which are incorporated herein by reference in their entirety.

TECHNICAL FIELD

This disclosure pertains to systems, methods, and media for control of speech preservation in speech enhancement.

BACKGROUND

Denoising techniques may be applied to noisy audio signals, for example, to generate denoised, or clean, audio signals. However, performing denoising techniques may be difficult, particularly for various types of audio content, such as audio content that includes music, dialog or conversation between multiple speakers, a mix of music and speech, etc.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via methods. Some methods may involve determining, by a control system, an aggressiveness control parameter value that modulates a degree of speech preservation to be applied when denoising audio signals. Some methods may involve obtaining, by the control system, a training set of training samples, a training sample of the training set having a noisy audio signal and a target denoising mask. Some methods may involve training, by the control system, a machine learning model by: a) generating a frequency domain representation of the noisy audio signal corresponding to the training sample; b) providing the frequency domain representation of the noisy audio signal to the machine learning model; c) generating a predicted denoising mask based on an output of the machine learning model; d) determining a loss representing an error of the predicted denoising mask relative to the target denoising mask corresponding to the training sample; e) updating weights associated with the machine learning model; and f) repeating a)-e) until a stopping criterion is reached. In some methods, the trained machine learning model is usable to take, as an input, a noisy test audio signal and generate a corresponding denoised test audio signal, and wherein the aggressiveness control parameter value is used for at least one of: 1) generating the frequency domain representation of the noisy audio signals included in the training set; 2) modifying the target denoising masks included in the training set; 3) determining an architecture of the machine learning model prior to training the machine learning model; or 4) determining the loss.

In some examples, generating the frequency domain representation of the noisy audio signal comprises: generating a spectrum of the noisy audio signal; and generating the frequency domain representation of the noisy audio signal by grouping bins of the spectrum of the noisy audio signal into a number of bands, wherein the number of bands is determined based on the aggressiveness control parameter value.

In some examples, modifying the target denoising masks included in the training set comprises applying a power function to a target denoising mask of the target denoising masks and wherein an exponent of the power function is determined based on the aggressiveness control parameter value.

In some examples, the machine learning model comprises a convolutional neural network (CNN), and wherein determining the architecture of the machine learning model comprises determining a filter size for convolutional blocks of the CNN based on the aggressiveness control parameter value.

In some examples, the machine learning model comprises a U-Net, and wherein determining the architecture of the machine learning model comprises determining a depth of the U-Net based on the aggressiveness control parameter value.

In some examples, determining the loss comprises applying a punishment weight to the error of the predicted denoising mask relative to the target denoising mask, and wherein the punishment weight is determined based at least in part on the aggressiveness control parameter value. In some examples, the punishment weight is based at least in part on whether the corresponding noisy audio signal associated with the training sample comprises speech.

Some methods involve determining, by a control system, an aggressiveness control parameter value that modulates a degree of speech preservation to be applied when denoising audio signals. Some methods involve providing, by the control system, a frequency domain representation of a noisy audio signal to a trained model to generate a denoising mask. Some methods involve modifying, by the control system, the denoising mask based at least in part on the aggressiveness control parameter value. Some methods involve applying, by the control system, the modified denoising mask to the frequency domain representation of the noisy audio signal to obtain a denoised spectrum. Some methods involve generating, by the control system, a time-domain representation of the denoised spectrum to generate denoised audio signal.

In some examples, modifying the denoising mask comprises applying a compressive function to the denoising mask, wherein a parameter associated with the compressive function is determined based on the aggressiveness control parameter value. In some examples, the compressive function comprises a power function, wherein an exponent of the power function is determined based on the aggressiveness control parameter value. In some examples, the compressive function comprises an exponential function, and wherein a parameter of the exponential function is determined based on the aggressiveness control parameter value.

In some examples, modifying the denoising mask comprising performing smoothing of the denoising mask for a frame of the noisy audio signal based on a denoising mask generated for a previous frame of the noisy audio signal. In some examples, performing the smoothing comprises multiplying the denoising mask for the frame of the noisy audio signal and a weighted version of the denoising mask generated for the previous frame of the noisy audio signal, wherein a weight used to generate the weighted version is determined based on the aggressiveness control parameter value. In some examples, the denoising mask for the frame of the noisy audio signal comprises a time axis and a frequency axis, and wherein smoothing is performed with respect to the time axis. In some examples, the denoising mask for the frame of the noisy audio signal comprises a time axis and a frequency axis, and wherein smoothing is performed with respect to the frequency axis.

In some examples, the aggressiveness control parameter value is determined based on whether a current frame of the noisy audio signal comprises speech.

In some examples, some methods further involve causing the generated denoised audio signal to be presented via one or more loudspeakers or headphones.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via an apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Denoising of a noisy audio signal may be performed using any number of denoising techniques. However, generating a denoised, or clean audio signal from an input noisy signal, may present a tradeoff between noise reduction and speech preservation. In particular, a more aggressive approach that prioritizes noise reduction may cause a reduction in speech preservation, whereas a more conservative approach that prioritizes speech preservation may cause excessive noise to remain in the generated denoised audio signal. This tradeoff may be particularly difficult to manage when a single denoising technique is applied to multiple types of audio content. For example, applying the same denoising technique to both audio content that includes dialog and audio content that does not include dialog may cause either lack of speech preservation in the dialog content and/or increased noise in the non-dialog content, both of which may be detrimental.

Disclosed herein are techniques, methods, systems, and media for controlling aggressiveness, or the tradeoff between speech preservation and noise reduction, in application of noise reduction techniques. In some embodiments, the aggressiveness of the denoising technique may be controlled by an aggressiveness control parameter value. For example, the aggressiveness control parameter value may indicate a desired balance between speech preservation and noise reduction. In some implementations, the aggressiveness control parameter value may be set based on a type of audio content associated with an input noisy audio signal, such as whether the input noisy audio signal includes dialog, music, or the like.

In some embodiments, an aggressiveness control parameter value may be utilized during training of a machine learning model that is utilized to generate a denoised audio signal. For example, in some implementations, the aggressiveness control parameter value may be used to modify training samples used by the machine learning model during training and/or may be used by a loss function to train the machine learning model. In some embodiments, the aggressiveness control parameter value may be used to determine or select the structure of the machine learning model.

In some implementations, an aggressiveness control parameter value may be utilized on an output of an algorithm that is used to generate the denoised audio signal. Usage of the aggressiveness control parameter value on an algorithm output is generally referred to herein as "post-processing." For example, in some embodiments, the aggressiveness control parameter value may be utilized on an output of a trained machine learning model used to generate a denoised audio signal.

Figure 1:
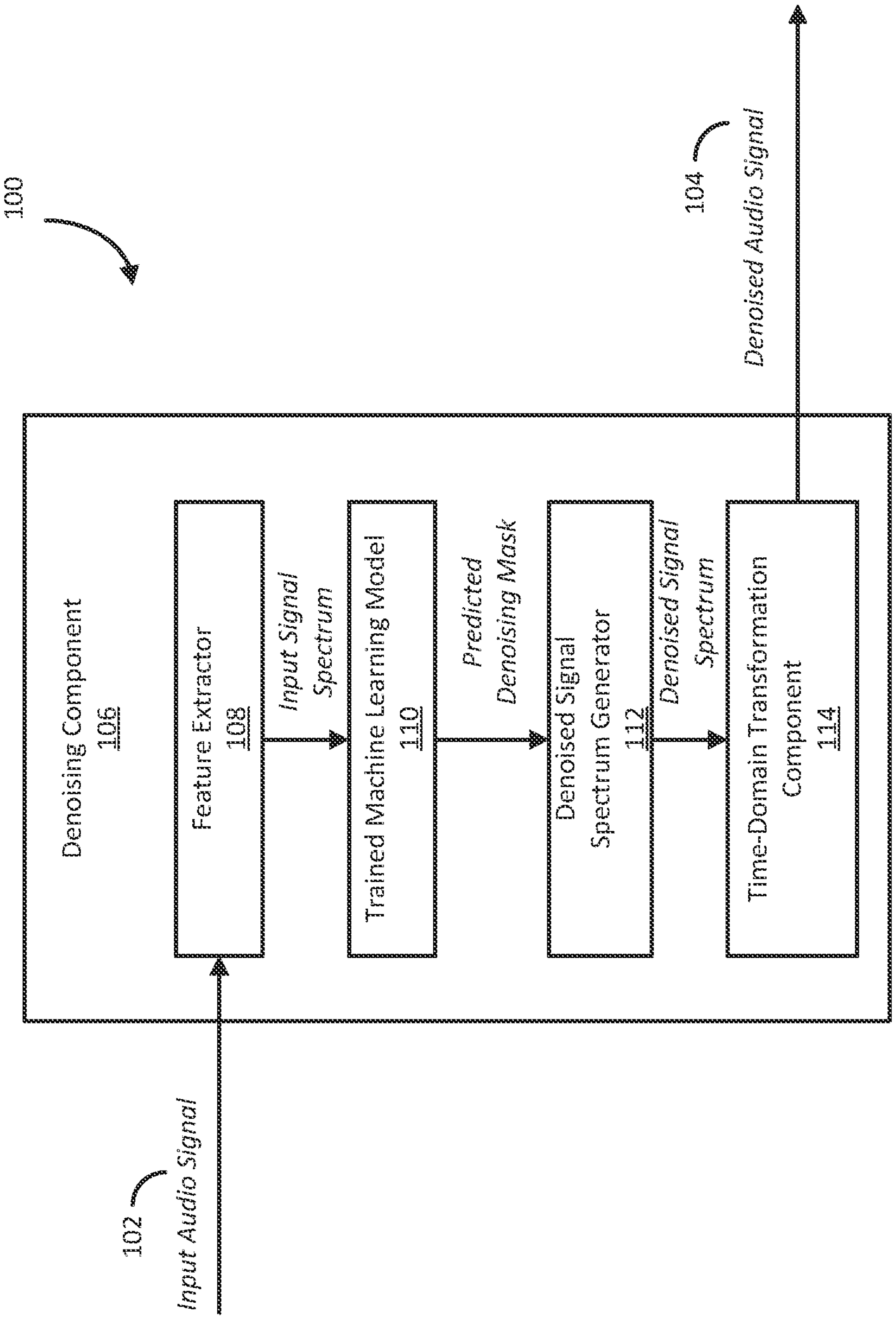
FIG. 1 shows a block diagram of an example system for performing denoising of audio signals in accordance with some implementations.
Figure 2:
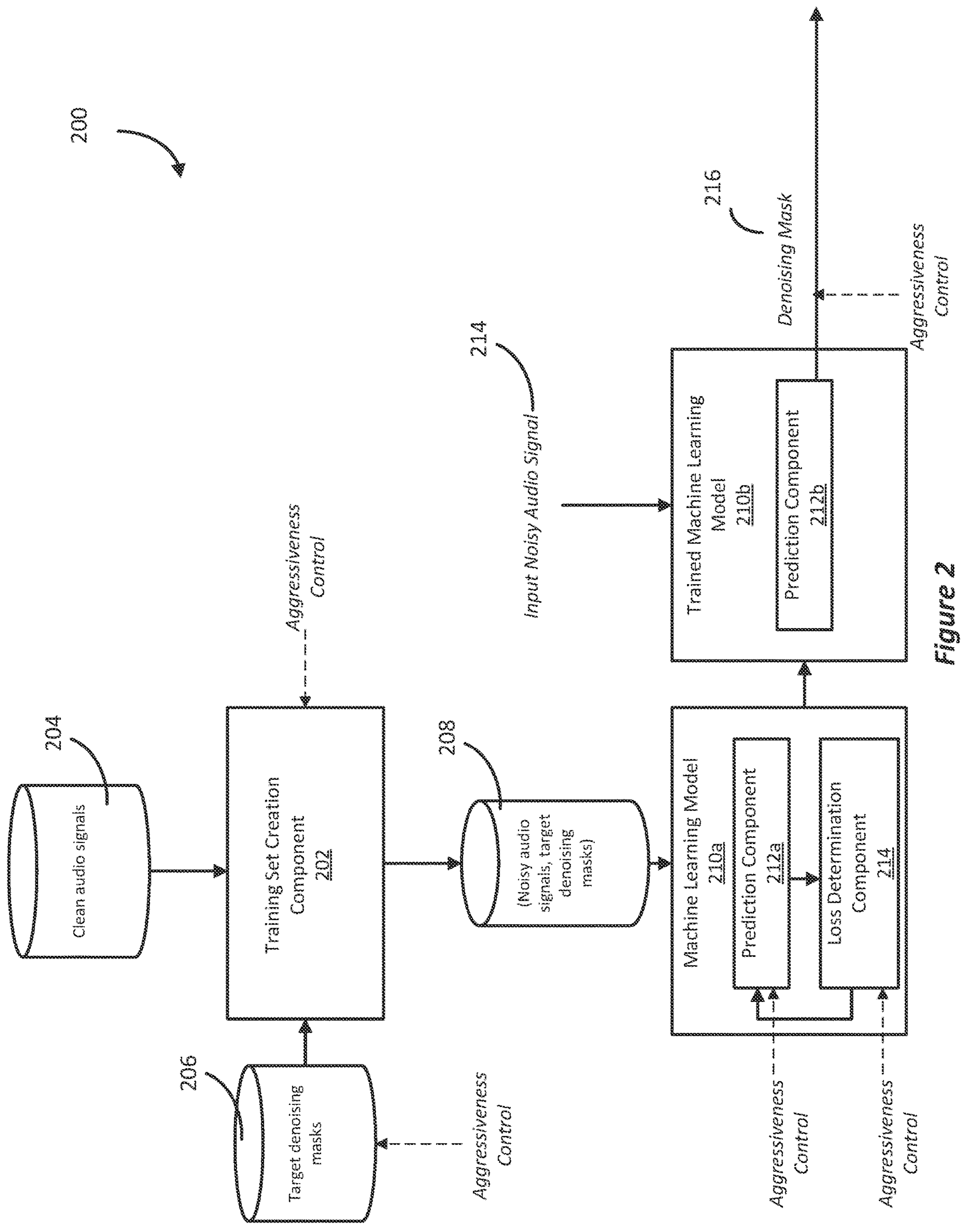
FIG. 2 shows a block diagram of an example system for performing denoising of audio signals in accordance with some implementations.
Figure 3:
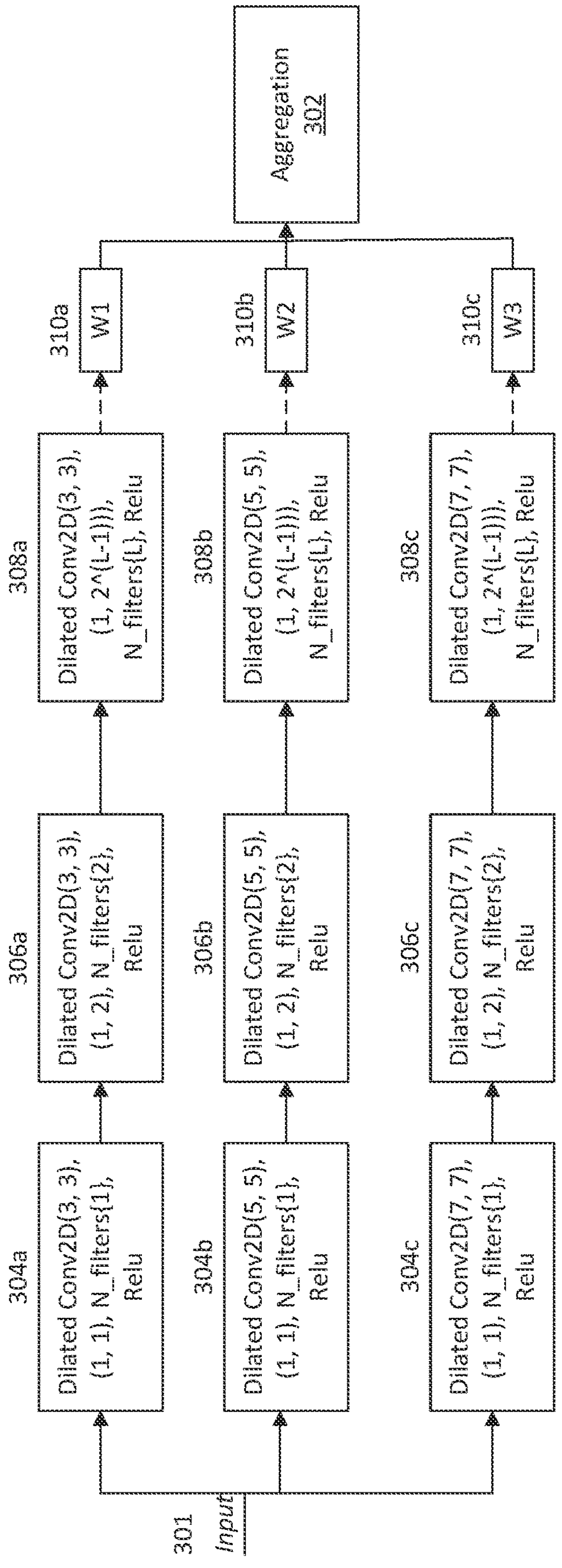
FIG. 3 illustrates an example convolutional neural network that may be used in accordance with some implementations.
Figure 4:
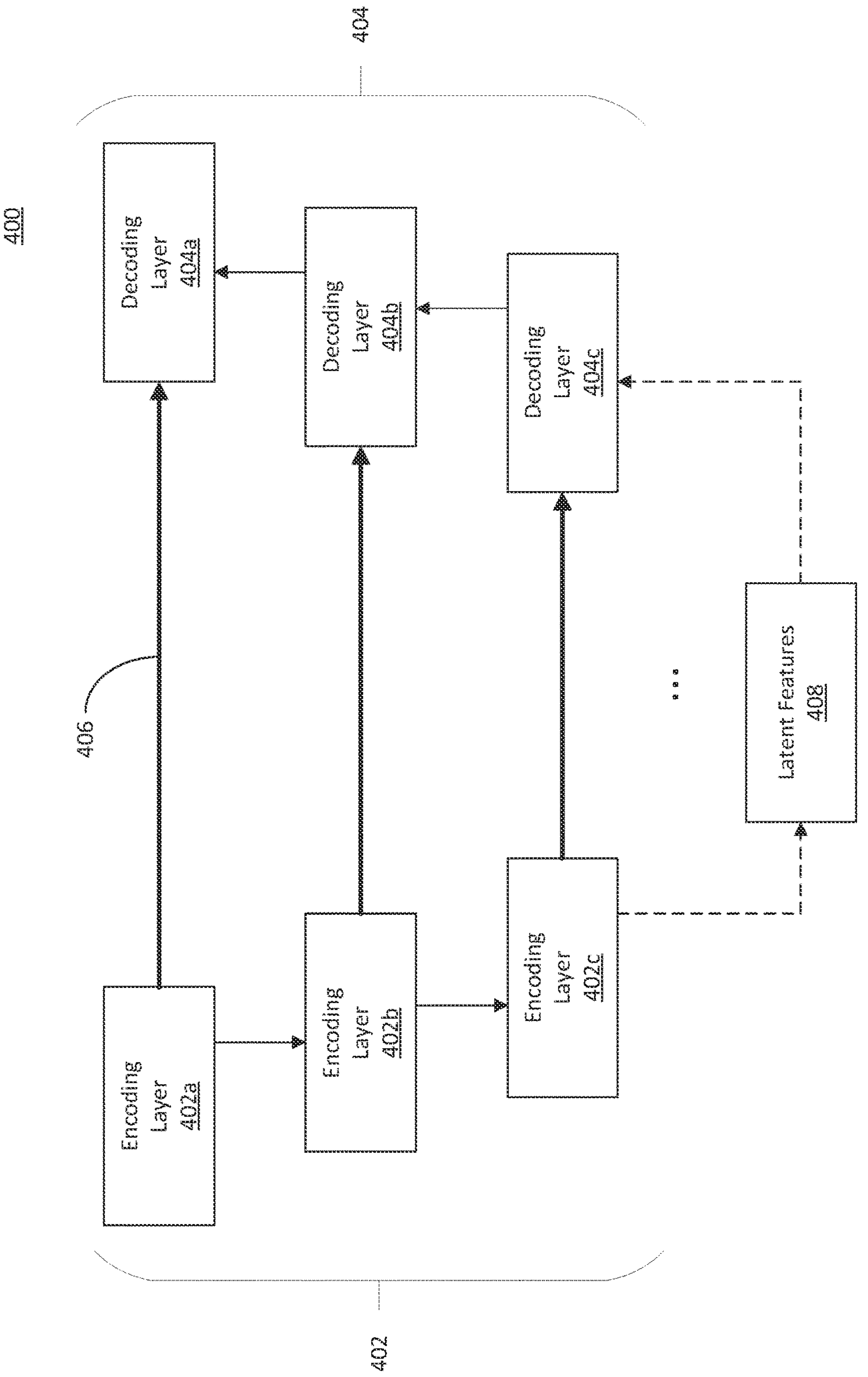
FIG. 4 illustrates an example U-Net architecture that may be used in accordance with some implementations.
Figure 5:
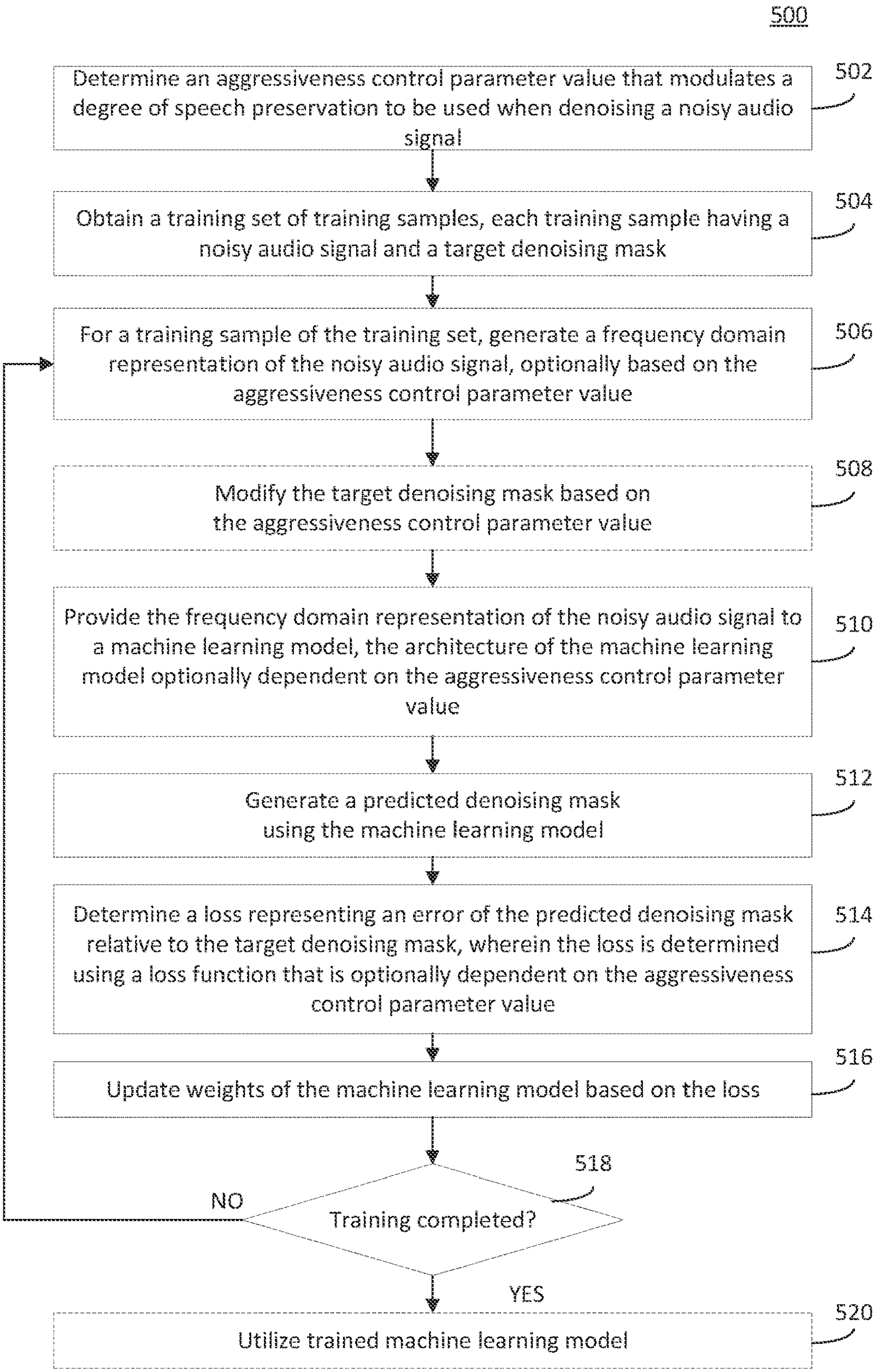
FIG. 5 is a flowchart of an example process for training a model for performing denoising in accordance with some implementations.
Figure 6:
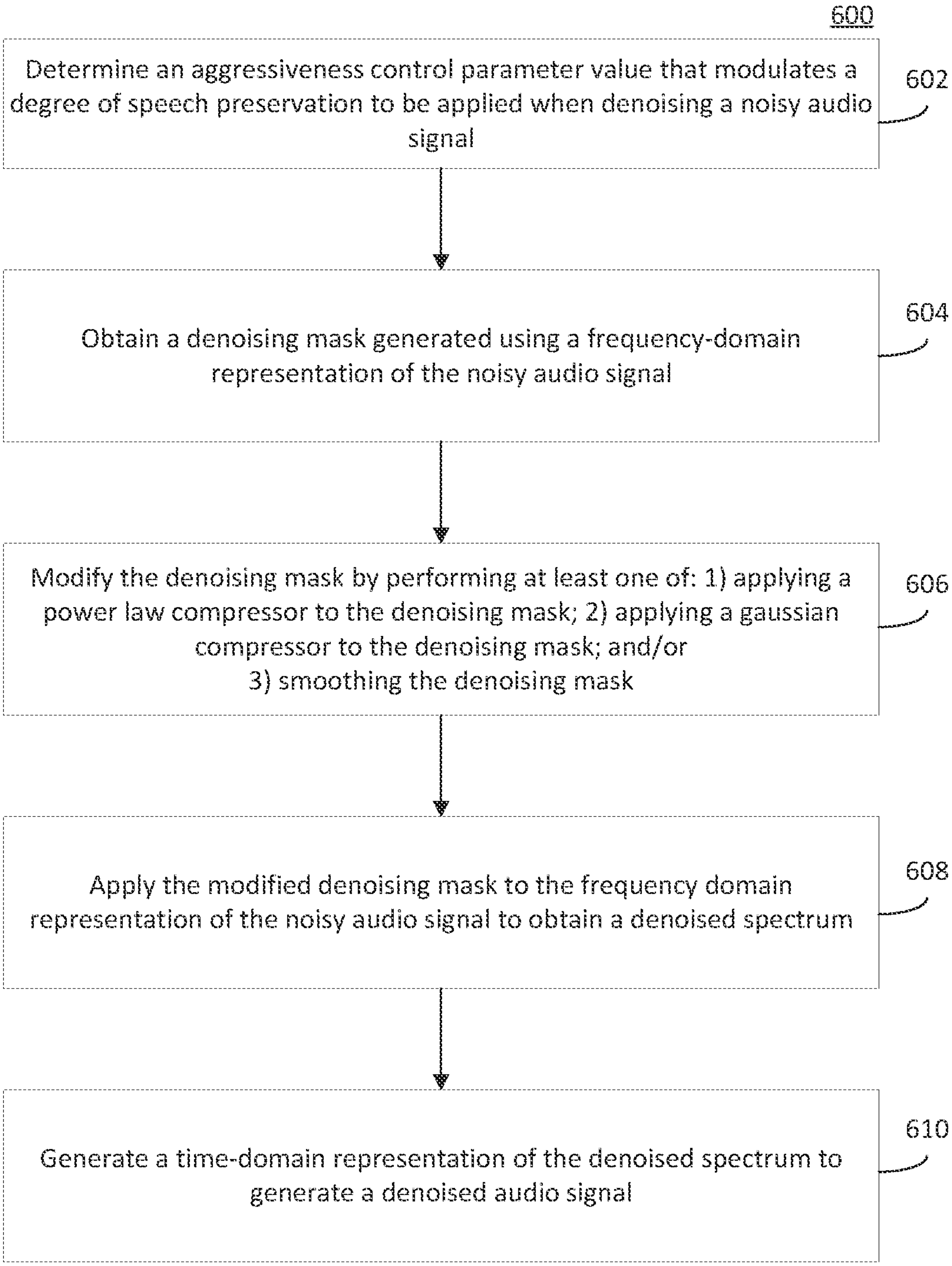
FIG. 6 is a flowchart of an example process for controlling degree of speech preservation in post-processing in accordance with some implementations.

FIG. 1 generally illustrates a system for generating denoised audio signals using a machine learning model. FIG. 2 generally depicts various ways that an aggressiveness control parameter value may be used, whether during training of a machine learning model, or in post-processing. FIGS. 3 and 4 show example architectures of a machine learning model that may be used in accordance with some embodiments. FIG. 5 depicts an example flowchart of a process for utilizing an aggressiveness control parameter value during training of a machine learning model, and FIG. 6 depicts an example flowchart of a process for utilizing an aggressiveness control parameter value in post-processing.

In some implementations, an input audio signal can be enhanced using a trained machine learning model. In some implementations, the input audio signal can be transformed to a frequency domain by extracting frequency domain features. In some implementations, a perceptual transformation based on processing by the human cochlea can be applied to the frequency-domain representation to obtain banded features. Examples of a perceptual transformation that may be applied to the frequency-domain representation include a Gammatone filter, an equivalent rectangular bandwidth filter, a transformation based on the Mel scale, or the like. In some implementations, the frequency-domain representation may be provided as an input to a trained machine learning model that generates, as an output, a predicted denoising mask. The predicted denoising mask may be a frequency-domain representation of a mask that, when applied to the frequency-domain representation of the input audio signal, generates a spectrum of a denoised audio signal. In some implementations, an inverse of the perceptual transformation may be applied to the predicted denoising mask to generate a modified predicted denoising mask. A frequency-domain representation of the enhanced audio signal may then be generated by multiplying the frequency-domain representation of the input audio signal by the modified predicted denoising mask. An enhanced audio signal may then be generated by transforming the frequency-domain representation of the enhanced audio signal to the time-domain.

In other words, a trained machine learning model for enhancing audio signals may be trained to generate, for a given frequency-domain input audio signal, a predicted denoising mask that, when applied to the frequency-domain input audio signal, generates a frequency-domain representation of a corresponding denoised audio signal. In some implementations, a predicted denoising mask may be applied to a frequency-domain representation of the input audio signal by multiplying the frequency-domain representation of the input audio signal and the predicted denoising mask. Alternatively, in some implementations, the logarithm of the frequency-domain representation of the input audio signal may be taken. In such implementations, a frequency domain representation of the denoised audio signal may be obtained by adding the logarithm of the predicted denoising mask and the logarithm of the frequency-domain representation of the input audio signal. In some implementations, rather than adding the logarithm of the predicted denoising mask and the logarithm of the frequency-domain representation, the logarithm of the input audio signal may be transformed to a linear domain, and the denoised signal may be obtained by multiplying the linear predicted denoising mask and the linear frequency domain representation of the original noisy signal.

It should be noted that, in some implementations, training a machine learning model may include determining weights associated with one or more nodes and/or connections between nodes of the machine learning model. In some implementations, a machine learning model may be trained on a first device (e.g., a server, a desktop computer, a laptop computer, or the like). Once trained, the weights associated with the trained machine learning model may then be provided (e.g., transmitted to) a second device (e.g., a server, a desktop computer, a laptop computer, a media device, a smart television, a mobile device, a wearable computer, or the like) for use by the second device for denoising audio signals.

FIG. 1 shows an example system for denoising audio signals. It should be noted that although FIG. 1 describes denoising audio signals, the systems and techniques described in connection with FIG. 1 may be applied to other types of enhancement, such as dereverberation, a combination of noise suppression and dereverberation, or the like. In other words, rather than generating a predicted denoising mask and a predicted denoised audio signal, in some implementations, a predicted enhancement mask may be generated, and the predicted enhancement mask may be used to generate a predicted enhanced audio signal, where the predicted enhanced audio signal is a denoised and/or dereverberated version of a distorted input audio signal.

FIG. 1 shows an example of a system 100 for denoising audio signals in accordance with some implementations. In some examples, the system 100 may be implemented by a control system, such as the control system 710 that is described herein with reference to FIG. 7. As illustrated, a denoising component 106 takes, as an input, an input audio signal 102, and generates, as an output, a denoised audio signal 104. In some implementations, denoising component 106 includes a feature extractor 108. Feature extractor 108 may generate a frequency-domain representation of input audio signal 102, which may be considered the input signal spectrum. The input signal spectrum may then be provided to a trained machine learning model 110. The trained machine learning model 110 may generate, as an output, a predicted denoising mask. The predicted denoising mask may be provided to a denoised signal spectrum generator 112. Denoised signal spectrum generator 112 may apply the predicted denoising mask to the input signal spectrum to generate a denoised signal spectrum (e.g., a frequency-domain representation of the denoised audio signal). The denoised signal spectrum may then be provided to a time-domain transformation component 114. Time-domain transformation component 114 may generate denoised audio signal 104.

As shown in and described above in connection with FIG. 1, a trained machine learning model may be used to generate a denoised audio signal from an input noisy audio signal. In some implementations, it may be desirable to control a degree of speech preservation in the denoised audio signal. For example, a more aggressive denoising technique may produce a greater degree of noise reduction while having worse performance on speech preservation, and vice versa. In some implementations, an aggressiveness of a denoising technique used to generate, from an input noisy audio signal, a corresponding denoised audio signal, may be controlled by an aggressiveness control parameter. In some implementations, the aggressiveness control parameter may be used to control the degree of speech preservation during training of the machine learning model. For example, the aggressiveness control parameter may be utilized while generating a training set to be used by the machine learning model. As a more particular example, the aggressiveness control parameter may be utilized to modify a frequency-domain representation of noisy audio signals included in the training set. As another particular example, the aggressiveness control parameter may be utilized to modify target denoising masks used during training of the machine learning model. As another example, in some embodiments, the aggressiveness control parameter may be utilized to construct an architecture of the machine learning model. As yet another example, in some embodiments, the aggressiveness control parameter may be utilized to determine a loss used by the machine learning model to iteratively determine weight parameters during a training process.

Additionally or alternatively, in some implementations, the aggressiveness control parameter may be used to alter a denoised audio signal generated by a trained machine learning model. Use of the aggressiveness control parameter on an output generated using a trained machine learning model is generally referred to as "post-processing." It should be noted that, in some embodiments, aggressiveness control parameters may be used in multiple ways and/or stages, which may include during machine learning model training and/or in post-processing. FIG. 2 illustrates a system that depicts multiple possible ways an aggressiveness control parameter may be used to control speech preservation when generating denoised audio signals. FIG. 5 depicts a flowchart of an example process for using an aggressiveness control parameter during training of a machine learning model. FIG. 6 depicts a flowchart of an example process for using an aggressiveness control parameter in post-processing.

As illustrated in FIG. 2, system 200 includes a training set creation component 202. In some examples, one or more components of the system 200 may be implemented by a control system, such as the control system 710 that is described herein with reference to FIG. 7. Training set creation component 202 may generate a training set that may be used by a machine learning model for denoising audio signals. In some implementations, training set component 202 may be implemented, for example, on a device that generates and/or stores a training set 208. In some implementations, each training sample may include a noisy audio signal and a corresponding target denoising mask to be generated by the machine learning model. Target denoising masks may be obtained from target denoising mask database 206. In some implementations, target denoising masks may be modified using the aggressiveness control parameter, as described below in connection with FIG. 5. In some implementations, training set component 202 may generate the noisy audio signals utilized in the training samples. For example, training set component 202 may apply a noise (e.g., a randomly selected noise signal from a candidate set of noise signals, a randomly generated noise, or the like) to clean audio signals stored in clean audio signal database 204. Continuing with this example, in some implementations, a target denoising mask may be determined based on the clean audio signal and the noise used to generate the noisy audio signal.

Training set 208 may then be used to train a machine learning model 210*a*. In some implementations, machine learning model 210*a* may be, or may include, a convolutional neural network (CNN), a U-Net, or any other suitable type of architecture. Example architectures are shown in and described below in connection with FIGS. 3 and 4. Machine learning model 210*a* may include a prediction component 212*a* and a loss determination component 214. Prediction component 212*a* may generate, for a noisy audio signal obtained from training set 208, a predicted denoising mask. Example techniques for generating the predicted denoising mask are described above in more detail in connection with FIG. 1 and below in connection with FIG. 5. Loss determination component 214 may determine a loss associated with the predicted denoising mask. For example, the loss may indicate a difference between the predicted denoising mask and a ground-truth denoising mask, e.g., the target associated with a particular training sample. The loss may be used to update weights associated with prediction component 212*a*. It should be noted that an aggressiveness control parameter may be used by prediction component 212*a* (e.g., to generate a predicted denoised signal) and/or loss determination component 214 (e.g., to determine a loss used to update weights of machine learning model 210*a*), as described below in more detail below in connection with FIG. 5.

After training, trained machine learning model 210*b* may utilize trained prediction component 212*b* (e.g., corresponding to finalized weights) to generate denoised audio signals. For example, trained machine learning model 210*b* may take, as an input, a noisy audio signal 214, and may generate, as an output, a denoising mask 216. Denoising mask 216 may then be applied to a frequency-domain representation of input noisy audio signal 214 to generate a denoised audio signal. It should be noted that trained machine learning model 210*b* may have the same architecture as machine learning model 210*a*. Additionally, it should be noted that, in some implementations, an aggressiveness control parameter may be utilized to adjust speech preservation in denoising mask 216 generated by trained machine learning model 210*b*. Application of an aggressiveness control parameter on a generated denoising mask is generally referred to herein as applying the aggressiveness control parameter in post-processing, and is described further in connection with FIG. 6.

In some implementations, a machine learning model used to generate denoised audio signals may be a CNN. In some implementations, an aggressiveness control parameter may be used to construct an architecture of the CNN. For example, in some embodiments, a convolutional layer of the CNN may have a kernel size k, where the convolutional layer implements a filter having size (k, k). Continuing with this example, larger filter sizes, e.g., larger values of k, may correspond to more conservative results, or higher speech preservation, relative to smaller values of k. In other words, in some implementations, the aggressiveness control parameter may be used to select a kernel size to be used in one or more convolutional layers of the CNN to be trained. It should be noted that, in some implementations, a CNN-based model may include multiple convolutional paths, each utilizing a different filter size. In such implementations, the aggressiveness control parameter may be used to set weights associated with each convolutional path. For example, in an instance in which the aggressiveness control parameter indicates that higher aggressiveness, e.g., more noise reduction and less speech preservation, the aggressiveness control parameter may be used to more heavily weight convolutional paths associated with smaller filter sizes, and to less heavily weight convolutional paths associated with larger filter sizes. Conversely, in an instance in which the aggressiveness control parameter indicates higher conservativeness, e.g., less noise reduction and more speech preservation, the aggressiveness control parameter may be used to more heavily weight convolutional paths associated with larger filter sizes, and to less heavily weight convolutional paths associated with smaller filter sizes.

FIG. 3 illustrates an example CNN that includes multiple convolutional paths in accordance with some implementations. As illustrated, an input 301 is provided to the multiple convolutional paths. In some embodiments, each convolutional path may include L convolutional layers, where L is a natural number greater than or equal to 1. For example, the first convolutional path includes layers 304*a*, 306*a*, and 308*a*, the second convolutional path includes layers 304*b*, 306*b*, and 308*b*, and the third convolutional path includes layers 304*c*, 306*c*, and 308*c*. Continuing this example, an $l^{th}$ layer among the L layers may have $N_l$ filters, with l=1 . . . . L. Examples of L include 3, 4, 5, 10, or the like. In some embodiments, for each parallel convolution path, the number of filters Ny of the $l^{th}$ layer may be given by $N_l=1*N_0$, where $N_0$ is a predetermined constant greater than or equal to 1.

In some embodiments, the filter size of the filters may be the same, e.g., uniform, within each parallel convolution path. For example, a filter size of 3×3 may be used in each layer L within a parallel convolution path, e.g., 304*a*, 306*a*, and 308*a*. By using the same filter size in each parallel convolution path, mixing of different scale features may be avoided. In this way, the CNN learns the same scale feature extraction in each path, which greatly improves the convergence speed of the CNN. In an embodiment, the filter size of the filters may be different between different convolution paths. For example, the filter size of the first convolution path that includes 304*a*, 306*a*, and 308*a* is 3×3. Continuing with this example, the filter size of the second convolution path that includes 304*b*, 306*b*, and 308*b* is 5×5. Continuing still further with this example, the filter size of the third convolution path that includes 304*c*, 306*c*, and 308*c* is 7×7. It should be noted filter sizes other than that depicted in FIG. 3 may be used. In some embodiments, the filter size may depend on a harmonic length to conduct feature extraction.

In some embodiments, for a given convolution path, prior to performing the convolution operation in each of the L convolution layers, the input to each layer may be zero padded. In this way, the same data shape from input to output may be maintained.

In some embodiments, for a given convolution path, a non-linear operation may be performed in each of the L convolution layers. The non-linear operation may include one or more of a parametric rectified linear unit (PRelu), a rectified linear unit (Relu), a leaky rectified linear unit (LeakyRelu), an exponential linear unit (Elu), and/or a scaled exponential linear unit (Selu). In some embodiments, the non-linear operation may be used as an activation function in each of the L convolution layers.

In some implementations, for a given parallel convolution path, the filters of at least one of the layers of the parallel convolution path may be dilated 2D convolutional filters. The use of dilated filters enables to extract the correlation of harmonic features in different receptive fields. Dilation enables reaching of far receptive fields by skipping over a series of time-frequency (TF) bins. In some embodiments, the dilation operation of the filters of the at least one of the layers of the parallel convolution path may be performed on the frequency axis only. For example, a dilation of (1, 2) in the context of this disclosure may indicate that there is no dilation along the time axis (dilation factor of 1), while every other bin along the frequency axis is skipped (dilation factor of 2). In general, a dilation of (1, d) may indicate that (d−1) bins are skipped along the frequency axis between bins that are used for the feature extraction by the respective filter.

In some embodiments, for a given convolution path, the filters of two or more of the layers of the parallel convolution path may be dilated 2D convolutional filters, where a dilation factor of the dilated 2D convolutional filters increases exponentially with increasing layer number l. In this way, an exponential receptive field growth with depth can be achieved. As illustrated in the example of FIG. 3, in an embodiment, for a given parallel convolution path, a dilation may be (1, 1) in a first of the L convolution layers, the dilation may be (1, 2) in a second of the L convolution layers, the dilation may be (1, 2^(l−1)) in the l-th of the L convolution layers, and the dilation may be (1, 2^(L−1)) in the last of the L convolution layers, where (c, d) indicates a dilation factor of c along the time axis and a dilation factor of d along the frequency axis.

The aggregated multi-scale CNN may be trained. Training of the aggregated multi-scale CNN may involve the following steps: (i) calculating frame FFT coefficients of original noisy speech and target speech; (ii) determining the magnitude of the noisy speech and the target speech by ignoring the phase; (iii) determining the target output mask by determining the difference between the magnitude of the noisy speech and the target speech; (iv) limiting the target mask to a range based on a statistic histogram; (v) using multiple frame frequency magnitude of noisy speech as input; (vi) using the corresponding target mask of step (iii) as an output.

It should be noted that, in step (iii), the target output mask may be determined using:

$$\text{Target mask} = \|Y(t, f)\| / \|X(t, f)\|$$

In some embodiments, the features extracted from each of the parallel convolution paths of the aggregated multi-scale CNN from the time-frequency transform of the multiple frames of the original noisy speech signal input 301 are output. The outputs from each of the parallel convolution paths are then aggregated in aggregation block 302 to obtain the aggregated output. In some embodiments, weights 310*a*, 310*b*, and 310*c* may be applied to each of the parallel convolution paths, as shown in FIG. 3. Weights 310*a*, 310*b*, and 310*c* may be determined based at least in part on an aggressiveness control parameter value, e.g., to set or modify weights associated with different filter sizes of the parallel convolution paths.

In some implementations, a machine learning model utilized to generate a denoising mask may be a CNN that has a U-Net architecture. Such a U-Net may have M encoding layers and M corresponding decoding layers. Feature information from a particular encoding layer m may be passed to a corresponding m'h decoding layer via a skip connection, thereby allowing the decoding layers to utilize not only feature information from a preceding decoding layer, but to additionally utilize feature information from a corresponding encoding layer that is passed via the skip connection. As used herein, a skip connection refers to passing feature information from one layer of the network to a layer other than the subsequent following layer. The value of M, indicating the number of encoding layers and corresponding decoding layers, represents a depth of the U-Net. In some implementations, the depth of the U-Net may be determined based on an aggressiveness control parameter. In particular, in some implementations, a deeper U-Net, or correspondingly, a larger value of M, may be used for a machine learning model that produces more aggressive denoising masks relative to a shallowed U-Net having a smaller value of M. In other words, U-Nets that utilize larger values of M may produce more aggressive denoising masks that more effectively reduce noise at the expense of speech preservation, whereas U-Nets that utilizes smaller values of M may produce more conservative denoising masks that more effectively preserve speech at the expense of noise reduction.

FIG. 4 shows an example of U-Net architecture 400 that may be implemented in association with a machine learning model in accordance with some implementations. U-Net 400 includes a set of encoding layers 402 and a corresponding set of decoding layers 404. An input may successively pass through encoding layers of the set of encoding layers 402, where feature information generated from an encoding layer is passed to the subsequent encoding layer. For example, an input may be provided to encoding layer 402*a*. Continuing with this example, an output of encoding layer 402*a* may be provided to encoding layer 402*b*, which output is then provided to encoding layer 402*c*. The final encoding layer generates latent features 408, which is then passed to a first decoding layer of set of decoding layers 404. The output of each decoding layer is then passed through to the subsequent decoding layer, as indicated by the arrows in FIG. 4, such that the top-most decoding layer generates a final output. For example, information may be passed from decoding layer 404*c*, to decoding layer 404*b*, and then to decoding layer 404*a*, which generates the final output. As illustrated, each encoding layer also passes feature information to the decoder layer at the corresponding level of the U-Net via skip connections. For example, feature information generated by encoding layer 402*a* is passed via skip connection 406 to decoding layer 404*a*, as illustrated in FIG. 4. Note that three encoding layers and a corresponding three decoding layers are illustrated in FIG. 4, to depict a U-Net having a depth of 3. In accordance with some implementations, increasing the depth of the U-Net (e.g., to 4, 5, 8, etc. layers) may increase an aggressiveness of a denoising technique that utilizes a denoising mask generated by the U-Net. Conversely, decreasing the depth of the U-Net (e.g., to 2 layers) may increase speech preservation of a denoising technique that utilizes a denoising mask generated by the U-Net.

As described above in connection with FIG. 2, an aggressiveness control parameter may be used to modulate a balance between speech preservation and noise reduction in training a machine learning model that generates a denoising mask used to generate a denoising signal. The aggressiveness control parameter may be used in different ways, or in a combination of ways. For example, the aggressiveness control parameter may be used to: generate a frequency domain representation of a noisy audio signal that is provided to the machine learning model during training; modify a target denoising mask that is a target for the machine learning model to generate for a given input during training; the architecture of the machine learning model; and/or in determining a loss used to update weights of the machine learning model during training.

FIG. 5 illustrates a flowchart of an example process 500 for training a machine learning model that generates a denoising mask that can be used for generating a denoised audio signal. In some embodiments, blocks of process 500 may be executed by a control system. An example of such a control system is shown in and described below in connection with FIG. 7. In some implementations, blocks of process 500 may be executed in an order other than what is shown in FIG. 5. In some embodiments, two or more blocks of process 500 may be executed substantially in parallel. In some embodiments, one or more blocks of process 500 may be omitted.

Process 500 can begin at 502 by determining an aggressiveness control parameter value that modulates a degree of speech preservation to be used when denoising a noisy audio signal. In some implementations, the aggressiveness control parameter value may be determined based on a type of audio content that is to be processed using the machine learning model. For example, in an instance in which the machine learning model is to generate denoising masks to be applied to audio content that includes conversational content (e.g., with multiple talkers), or the like, the aggressiveness control parameter may be set to a value that is relatively low, e.g., conservative, and therefore prioritizes speech preservation over noise reduction. Conversely, in an instance in which the machine learning model is to generate denoising masks to be applied to audio content that includes a single talker or other non-dialog-heavy content, the aggressiveness control parameter may be set to a relatively larger value that prioritizes noise reduction over speech preservation.

At 504, process 500 can obtain a training set of training samples, each training sample having a noisy audio signal and a target denoising mask. In some implementations, noisy audio signals included in the training set may be generated by applying a noise signal to a clean audio signal. In some implementations, the noise signal may be randomly selected from a set of candidate noise signals and mixed with the clean audio signal, for example, to achieve a randomly selected signal-to-noise ratio (SNR). In some implementations, the noise signal may be random noise that is generated for mixing with the clean audio signal.

At 506, process 500 may, for a training sample of the training set, generate a frequency domain representation of the noisy audio signal, optionally based on the aggressiveness control parameter value. As described above in connection with FIG. 1, the frequency domain representation of the noisy audio signal may be generated by determining a spectrum of the noisy audio signal having N bins, represented herein as $Spec^{T*N}$, where T is the frame number of the audio signal, and where N is the frequency bin. The spectrum may then be "banded," or modified by grouping the frequency bins of the spectrum into various frequency bands (which may be referred to herein simply as "bands"). In some implementations, the bands may be determined based on a representation of cochlear processing of the human ear. In an instance in which the spectrum is grouped into B bands, and where W represents a band matrix, which may be determined based on a Gammatone filterbank, equivalent rectangular bandwidths, a Mel filter, or the like, the banded spectrum may be determined by:

$$\text{Banded}_{Spectrum} = Spec^{T*N} * W^{N*B}$$

In some implementations, the value of B, or the number of bands into which the frequency bins of the spectrum are grouped, may be determined based on the aggressiveness control parameter value. For example, a smaller value of B, or a smaller number of bands, may result in: increased speech preservation for audio signals including dialog segments; aggressive noise reduction in non-dialog segments; and increased residual noise within dialog segments. In other words, a smaller value of B may result in increased speech preservation for dialog segments at the expense of increased residual noise within the dialog segments, and aggressive noise reduction in non-dialog segments. Conversely, a larger value of B, or a larger number of bands, may result in: more aggressive noise reduction within dialog segments at the expense of speech preservation; and increased residual noise in non-dialog segments.

At 508, process 500 can optionally modify the target denoising mask based on the aggressiveness control parameter value. It should be noted that, in some embodiments, block 508 may be omitted, and process 500 can proceed to block 510.

A target denoising mask is generally represented herein as MSM(t, f), where t corresponds to time components, and f corresponds to frequency components. In some implementations, the denoising mask may be determined by:

$$MSM(t, f) = \frac{|Y(x, f)|}{|X(x, f)|}$$

In the equation given above, Y and X denote the spectrums of clean audio signal and a noisy audio signal, respectively. For example, Y may be the spectrum of a clean audio signal, and X may be the spectrum of the noise of the audio signal. In other words, given a denoising mask, the clean audio spectrum may be obtained by multiplying the denoising mask with the spectrum of the noisy audio spectrum.

Note that, as described above in connection with block 504, each training sample may include a target denoising mask that is to be predicted by the machine learning model for a corresponding noisy audio signal. In some implementations, the target denoising mask for the particular training sample may be modified based on the aggressiveness control parameter value. For example, the target denoising mask may be modified by applying a power to the target denoising mask, where the power is represented by α. An example of modifying the target denoising mask by applying a power α is given by:

$$MSM_{new}(t, f) = \frac{|Y(x, f)|^{\alpha}}{|X(x, f)|^{\alpha}}$$

The power α may be within a range of 0 to 1 to generate a more conservative result that prioritizes speech preservation. In some embodiments, the power α may be greater than 1 to generate a more aggressive result that prioritizes noise reduction. Example values of α include 0.2, 0.5, 0.8, 1, 1.2, 1.5, 2, 2.5, 3, or the like. In some implementations, α may be determined based on the aggressiveness control parameter value. For example, α may be set at a relatively smaller value responsive to the aggressiveness control parameter value indicating that speech preservation is to be prioritized at the expense of noise reduction, and vice versa.

At 510, process 500 can provide the frequency domain representation of the noisy audio signal to a machine learning model, the architecture of the machine learning model optionally dependent on the aggressiveness control parameter value. As described above in connection with FIG. 1, the frequency domain representation of the noisy audio signal, which may be a banded spectrum of the noisy audio signal as described above in connection with block 506, is provided as an input to the machine learning model. As described above in connection with FIGS. 3 and 4, the architecture of the machine learning model may have been determined or selected based on the aggressiveness control parameter value. For example, in an instance in which the machine learning model includes a CNN, the filter size used in convolution layers may be determined based on the aggressiveness control parameter value. As a more particular example, as shown in and described above in connection with FIG. 3, larger filter sizes may cause the machine learning model to produce more conservative results that prioritize speech preservation over noise reduction. Conversely, smaller filter sizes may cause the machine learning model to produce more aggressive results that prioritize noise reduction over speech preservation. As another example, in an instance in which the machine learning model includes a U-Net, the depth of the U-Net may be determined or selected based on the aggressiveness control parameter value, as described above in connection with FIG. 4. As a more particular example, the depth of the U-Net may be relatively greater to generate more aggressive results that prioritize noise reduction over speech preservation. Conversely, a relatively shallower U-Net may be utilized to generate more conservative results that prioritize speech preservation over noise reduction.

At 512, process 500 may generate a predicted denoising mask using the machine learning model. For example, the predicted denoising mask may be the output of the machine learning model when the frequency domain representation of the noisy audio signal is provided as an input to the machine learning model, as described above in connection with FIG. 1.

At 514, process 500 can determine a loss representing an error of the predicted denoising mask relative to the target denoising mask for the training sample, where the loss is determined using a loss function that is optionally dependent on the aggressiveness control parameter value. For example, in some implementations, the aggressiveness control parameter value can be used to set a punishment factor used in the loss function, where the punishment factor indicates whether the loss function more heavily penalizes over suppression of noise or under suppression of noise. In one example, the loss function may be represented by:

$$\text{loss} = \text{mean}(P * |y_{pred}(i, j) - y_{true}(i, j)|^{\gamma})$$

In the equation given above, γ represents a power factor, $y_{true}$ represents the target denoising mask for the training sample, $y_{pred}$ represents the predicted denoising mask generated by the machine learning model at block 512, i represents the frame index, j represents the frequency band index, and P represents a punishment weight matrix. In some implementations, P has the same dimensions as $y_{pred}$ and $y_{true}$.

In some embodiments, P may be determined by:

$$P(i, j) = \begin{cases} a, & y_{pred}(i, j) < y_{true}(i, j) \\ b, & \text{otherwise} \end{cases}$$

Given the equation above, in an instance in which a>b, the punishment weight applied in the loss function may be greater in instances in which the predicted denoising mask is less than the target denoising mask, indicating excessive noise suppression at the expense of speech preservation.

In some embodiments, the loss function may be determined by:

$$\text{loss} = |y_{pred} - y_{true}| * (\text{sign}(y_{true} - y_{pred}) * \alpha + \beta))$$

In the equation given above, the values of α and β may be two parameters that serve as punishments weights to punish over suppression of noise or under suppression of noise. The values of α and β may be set based on the aggressiveness control parameter value. Example values of α and β include 0.3, 0.5, 0.7, 1, 1.2, or the like.

Note that, in the loss function examples given above, the same punishment weight parameters are used regardless of the type of audio content included in the training sample. For example, the same punishment weight parameters are utilized for dialog segments and non-dialog segments. In some implementations, dialog segments and non-dialog segments may be considered differently when applying the loss function. It should be noted that, in some embodiments, dialog segments and non-dialog segments may be identified using any suitable techniques, such as by identifying metadata or other flags that specify whether a particular frame or segment of the audio signal correspond to dialog or non-dialog segments, or the like. This may allow over suppression of noise at the expense of speech preservation to be punished more heavily for dialog segments relative to non-dialog segments. In some embodiments, a loss function may include two components, one that sets a first punishment weight that is applied to dialog segments, and one that sets a second punishment weight that is applied to non-dialog segments. The two components of the loss function may be gated by a gating threshold g. An example of such a loss function is given by:

$$\text{loss} = \text{mean}(g * P_1 * |y_{pred}(i, j) - y_{true}(i, j)|^{\gamma} + (1 - g) * P_2 * |y_{pred}(i, j) - y_{true}(i, j)|^{\gamma}$$

In the equation given above, the gating control may be given by:

$$g = \begin{cases} 1, & \text{dialog segment} \\ 0, & \text{non-dialog segment} \end{cases}$$

In the loss function given above, $P_1$ and $P_2$ may represent two punishment weight matrixes applied to dialog segments and non-dialog segments, respectively, based on the gating control. In one example, $P_1$ may be given by:

$$P_1(i, j) = \begin{cases} a, & y_{pred}(i, j) < y_{true}(i, j) \\ b, & \text{otherwise} \end{cases}$$

As described above, a and b are constants that may be determined based on the aggressiveness control parameter value to control punishment of over suppression of noise relative to punishment of under suppression of noise for dialog segments.

In one example, $P_2$ may be given by:

$$P_2(i, j) = \begin{cases} c, & y_{pred}(i, j) < y_{true}(i, j) \\ d, & \text{otherwise} \end{cases}$$

Similar to what is described above in connection with $P_1$, c and d represent constants that may be determined based on the aggressiveness control parameter value to control punishment of over suppression of noise relative to punishment of under suppression of noise for non-dialog segments.

At 516, process 500 may update weights of the machine learning model based on the loss(es). For example, process 500 may update weights associated with one or more layers of the machine learning model based on the loss. Any suitable technique may be used for updating the weights, such as gradient descent, batched gradient descent, or the like. Note that, in some implementations, process 500 may update the weights in a batched manner rather than updating weights for each training sample.

At 518, process 500 can determine whether training of the machine learning model has been completed. For example, process 500 can determine whether all of the training samples have been processed, whether more than a predetermined number of training epochs have been completed, and/or whether changes in weights of the machine learning model in successive training iterations are less than a predetermined change threshold.

If, at 518, process 500 determines that training of the machine learning model has not been completed ("no" at block 518), process 500 can loop back to block 506 and can continue training the machine learning model, e.g., with another training sample of the training set. In some implementations, process 500 may loop through blocks 506-518 until process 500 determines that training is complete.

Conversely, if, at 518, process 500 determines that training of the machine learning has been completed ("yes" at 518), process 500 can continue to block 520 and can optionally utilize the trained machine learning model. For example, in some embodiments, process 500 can store the weights representing the trained machine learning model as parameters. Continuing with this example, process 500 can apply, at inference time, a frequency domain representation of a test noisy audio signal to the trained machine learning model to generate a denoising mask that can be utilized to generate a denoised audio signal, as shown in and described above in connection with FIGS. 1 and 2. In some embodiments, the weights associated with the trained machine learning model may be provided to an end user device, which may then utilize the weights, at inference time, to denoise noisy audio signals.

In some implementations, an aggressiveness control parameter may be applied to a denoising mask that has been generated, e.g., by a machine learning model. For example, the aggressiveness control parameter may be applied to the denoising mask to generate a modified denoising mask, where the aggressiveness control parameter is used to modulate a degree of speech preservation when utilizing the modified denoising mask to generate a denoised audio signal. The modified denoising mask may then be used to generate a denoised audio signal. The denoising mask may be modified based on the aggressiveness control parameter in different ways. For example, in some implementations, the denoising mask may be modified by applying a power-law compressor function to the denoising mask, where a power value of the power-law compressor is determined based at least in part on the aggressiveness control parameter. As another example, in some implementations, the denoising mask may be modified by applying a gaussian compressor function to the denoising mask, where a variance of the gaussian compressor is determined based at least in part on the aggressiveness control parameter. Note that, as will be described in more detail below, the gaussian compressor may be additionally or alternatively referred to as an exponential function. As yet another example, in some implementations, the denoising mask may be modified by smoothing the denoising mask.

FIG. 6 a flowchart of an example process 600 for modifying a denoising mask based on an aggressiveness control parameter. In some embodiments, blocks of process 600 may be executed by a control system. An example of such a control system is shown in and described below in connection with FIG. 7. In some implementations, blocks of process 600 may be executed in an order other than what is shown in FIG. 6. In some embodiments, two or more blocks of process 600 may be executed substantially in parallel. In some embodiments, one or more blocks of process 600 may be omitted.

Process 600 can begin at 602 by determining an aggressiveness control parameter value that modulates a degree of speech preservation to be applied when denoising a noisy audio signal. As described above, in some implementations, the aggressiveness control parameter value may be determined based on a type of audio content that is to be processed using the machine learning model. For example, in an instance in which denoising is to be applied to audio content that includes conversational content (e.g., with multiple talkers), or the like, the aggressiveness control parameter may be set to a value that is relatively low and therefore prioritizes speech preservation over noise reduction. Conversely, in an instance in which denoising is to be applied to audio content that includes a single talker or other non-dialog-heavy content, the aggressiveness control parameter may be set to a relatively larger value that prioritizes noise reduction over speech preservation. It should be noted that, in some implementations, process 600 may determine whether a particular segment of the noisy audio signal to be denoised includes dialog or non-dialog content. For example, in some embodiments, process 600 may determine whether the segment includes dialog content or non-dialog content based on metadata or flags stored in connection with the noisy audio signal that indicate portions or segments of the noisy audio signal that include dialog. It should further be noted that some noisy audio signals, such as movie soundtracks, or the like, may include some dialog segments and some non-dialog segments. In such cases, process 600 may set different aggressiveness control parameter values for different segments or portions of the noisy audio signal, based, for example, on whether the particular segment or portion includes dialog.

At 604, process 600 can obtain a denoising mask, where the denoising mask was generated using a frequency-domain representation of the noisy audio signal. For example, as described above in connection with FIGS. 1, 2, and 5, the frequency-domain representation of the noisy audio signal may include a spectrum of the noisy audio signal. In some embodiments, the frequency-domain representation of the noisy audio signal may include the spectrum of the noisy audio signal modified by banding frequency bins of the spectrum, for example, based on a perceptual transformation that represents perceptual characteristics associated with the human cochlea.

In some embodiments, the denoising mask may be obtained by providing the frequency-domain representation of the noisy audio signal to a machine learning model that has been trained to generate the denoising mask as an output. The machine learning model may have any suitable architecture, e.g., a CNN, a U-Net, a recurrent neural network (RNN), or the like. In some embodiments, an aggressiveness control parameter, which may or may not be the same as the aggressiveness control parameter obtained at block 602, may have been used during training of the machine learning model or to select an architecture of the machine learning model, as described above in connection with FIGS. 2-5. However, it should be understood that, in some implementations, a machine learning model for which an aggressiveness control parameter was not previously used in training the machine learning model and/or in constructing the machine learning model, may be used. The denoising mask is generally referred to herein as MSM (1, f).

At 606, process 600 can modify the denoising mask by performing at least one of: 1) applying a power-law compressor to the denoising mask; 2) applying a gaussian compressor to the denoising mask; and/or 3) smoothing the denoising mask.

In some implementations, a power-law compressor may be applied to generate a modified denoising mask, generally referred to herein as $MSM_{mod}(t, f)$ by:

$$MSM_{mod}(t, f) = MSM(t, f)^{\alpha}$$

In the equation given above, α is a power value that is applied to the denoising mask obtained at block 604. The value of α may be determined based on the aggressiveness control parameter value. For example, responsive to determining based on the aggressiveness control parameter value that denoising is to be more conservative, e.g., to prioritize speech preservation over noise reduction, the value of α may be selected to be between 0 and 1. Example values of α to generate a result that prioritizes speech preservation over noise reduction include 0.1, 0.2, 0.6, 0.8, or the like. Conversely, responsive to determining, based on the aggressiveness control parameter value that denoising is to be more aggressive, e.g., to prioritize noise reduction over speech preservation, the value of α may selected to be greater than 1. Example values of α to generate a result that prioritizes noise reduction over speech preservation include 1.05, 1.1, 1.2, 1.3, 1.8, or the like.

In some implementations, a gaussian-compressor may be applied to generate a modified denoising mask, generally referred to herein as $MSM_{mod}$ by:

$$MSM_{mod} = e^{-(MSM-1)^2/var}$$

In the equation given above, var may be an adjustable parameter which may be determined based at least in part on the aggressiveness control parameter value. Applying a gaussian-compressor to the denoising mask may cause the modified denoising mask to have an s-shape, where the value of the modified denoising mask is greater than about 0.5 for high signal-to-noise ratio portions of the audio signal and is less than about 0.5 for low signal-to-noise ratios of the audio signal. The value of var may accordingly shift the function to the left or to the right, thereby changing a mid-point in terms of signal-to-noise ratio at which the value of the modified denoising mask is greater than or less than 0.5. Note that the s-shape function may essentially be an exponential function that is truncated at lower and upper limits. It should be noted that, in some implementations, the original denoising mask values may be maintained, while utilizing the shifted sigmoid of the modified denoising mask, by setting the modified denoising mask to be the minimum of the original denoising mask and the modified denoising mask after application of the gaussian-compressor.

In some implementations, smoothing may be performed on the denoising mask to generate the modified denoising mask. In some embodiments, smoothing may be performed by smoothing mask values associated with a current frame with mask values associated with the previous frame. Smoothing may be performed using any suitable filtering technique, such as mean filtering, median filtering, adaptive filtering, etc. In some embodiments, larger filter sizes may yield more conservative results in the denoised audio signal. Accordingly, a filter size used to perform filtering/smoothing may be determined by the aggressiveness control parameter value.

In particular, larger filter sizes may be used responsive to the aggressiveness control parameter value indicative of a preference for more conservative results, or prioritization of speech preservation over noise reduction. It should be noted that smoothing may only serve to generate more conservative denoised audio signals that prioritize speech preservation over noise reduction relative to the original denoising mask obtained at block 604. However, the aggressiveness control parameter value may be used to change a degree of speech preservation in the denoised audio signal.

It should be noted that smoothing/filtering may be performed with respect to the time axis, or with respect to the frequency axis. In one example, smoothing/filtering may be performed in the time axis by:

$$MSM_{mod}(t, f) = \max(\text{Mask}(t, f), \beta * \text{Mask}(t-1, f))$$

In the equation given above, β is a parameter that may be determined based at least in part on the aggressiveness control parameter value to change a degree of speech preservation in the denoised audio signal, where larger values of β correspond to increased speech preservation, or more conservative results. In some embodiments, β may be within a range of 0 to 1, inclusive. Example values of β include 0, 0.2, 0.5, 0.7, 0.8, 1, or the like.

In another example, smoothing/filtering may be performed in the frequency axis by:

$$MSM_{mod}(t, f) = \max(\text{Mask}(t, f), \beta * \text{Mask}(t, f-1))$$

Similar to what is described above, β is a parameter that may be determined based at least in part on the aggressiveness control parameter value to change a degree of speech preservation in the denoised audio signal, where larger values of β correspond to increased speech preservation, or more conservative results. In some embodiments. β may be within a range of 0 to 1. Example values of β include 0, 0.2, 0.5, 0.7, 0.8, 0.99, or the like.

It should be noted that the denoising mask may be modified in multiple ways. For example, in some embodiments, the denoising mask may be modified by applying a compressor function (whether a power law compressor, a gaussian compressor, or the like), and by performing smoothing/filtering.

At 608, process 600 can apply the modified denoising mask to the frequency domain representation of the noisy audio signal to obtain a denoised spectrum. Given a modified denoising mask represented by $MSM_{mod}$(t, f) and a frequency domain representation of the noisy audio signal represented by X(t, f), the denoised spectrum, represented as Y(t, f), may be determined by:

$$Y(t, f) = X(t, f) * MSM_{mod}(t, f)$$

In other words, in some implementations, the denoised spectrum may be obtained by multiplying the frequency domain representation of the noisy audio signal by the modified denoising mask.

At 610, process 600 can generate a time-domain representation of the denoised spectrum to generate a denoised audio signal. For example, as described above in connection with FIG. 1, process 600 can apply an inverse frequency transformation to the denoised spectrum to generate the denoised audio signal. In some implementations, process 600 can reverse a banding of frequency bins prior to applying the inverse frequency transformation.

Figure 7:
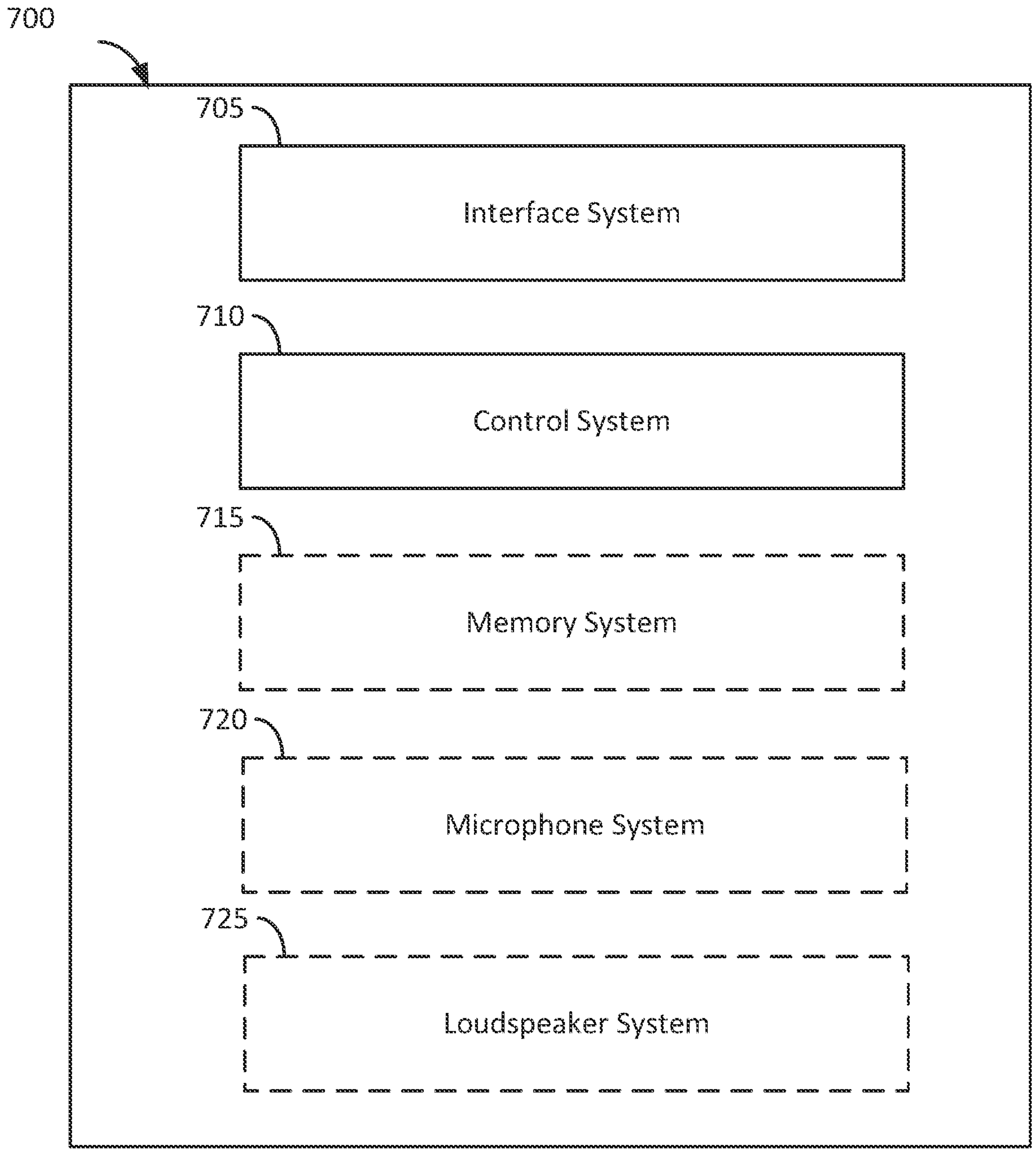
FIG. 7 shows a block diagram that illustrates examples of components of an apparatus capable of implementing various aspects of this disclosure.

FIG. 7 is a block diagram that shows examples of components of an apparatus capable of implementing various aspects of this disclosure. As with other figures provided herein, the types and numbers of elements shown in FIG. 7 are merely provided by way of example. Other implementations may include more, fewer and/or different types and numbers of elements. According to some examples, the apparatus 700 may be configured for performing at least some of the methods disclosed herein. In some implementations, the apparatus 700 may be, or may include, a television, one or more components of an audio system, a mobile device (such as a cellular telephone), a laptop computer, a tablet device, a smart speaker, or another type of device.

According to some alternative implementations the apparatus 700 may be, or may include, a server. In some such examples, the apparatus 700 may be, or may include, an encoder. Accordingly, in some instances the apparatus 700 may be a device that is configured for use within an audio environment, such as a home audio environment, whereas in other instances the apparatus 900 may be a device that is configured for use in "the cloud," e.g., a server.

In this example, the apparatus 700 includes an interface system 705 and a control system 710. The interface system 705 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 705 may, in some implementations, be configured for exchanging control information and associated data with audio devices of the audio environment. The control information and associated data may, in some examples, pertain to one or more software applications that the apparatus 700 is executing.

The interface system 705 may, in some implementations, be configured for receiving, or for providing, a content stream. The content stream may include audio data. The audio data may include, but may not be limited to, audio signals. In some instances, the audio data may include spatial data, such as channel data and/or spatial metadata. In some examples, the content stream may include video data and audio data corresponding to the video data.

The interface system 705 may include one or more network interfaces and/or one or more external device interfaces (such as one or more universal serial bus (USB) interfaces). According to some implementations, the interface system 705 may include one or more wireless interfaces. The interface system 705 may include one or more devices for implementing a user interface, such as one or more microphones, one or more speakers, a display system, a touch sensor system and/or a gesture sensor system. In some examples, the interface system 705 may include one or more interfaces between the control system 710 and a memory system, such as the optional memory system 715 shown in FIG. 7. However, the control system 710 may include a memory system in some instances. The interface system 705 may, in some implementations, be configured for receiving input from one or more microphones in an environment.

The control system 710 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 710 may reside in more than one device. For example, in some implementations a portion of the control system 710 may reside in a device within one of the environments depicted herein and another portion of the control system 710 may reside in a device that is outside the environment, such as a server, a mobile device (e.g., a smartphone or a tablet computer), etc. In other examples, a portion of the control system 710 may reside in a device within one environment and another portion of the control system 710 may reside in one or more other devices of the environment. For example, a portion of the control system 710 may reside in a device that is implementing a cloud-based service, such as a server, and another portion of the control system 710 may reside in another device that is implementing the cloud-based service, such as another server, a memory device, etc. The interface system 705 also may, in some examples, reside in more than one device.

In some implementations, the control system 710 may be configured for performing, at least in part, the methods disclosed herein. According to some examples, the control system 710 may be configured for implementing methods of utilizing an aggressiveness control parameter when training a machine learning model, utilizing an aggressiveness control parameter in post-processing, or the like.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 715 shown in FIG. 7 and/or in the control system 710. Accordingly, various innovative aspects of the subject matter described in this disclosure can be implemented in one or more non-transitory media having software stored thereon. The software may, for example, include instructions for utilizing an aggressiveness control parameter when training a machine learning model, utilizing an aggressiveness control parameter in post-processing, etc. The software may, for example, be executable by one or more components of a control system such as the control system 710 of FIG. 7.

In some examples, the apparatus 700 may include the optional microphone system 720 shown in FIG. 7. The optional microphone system 720 may include one or more microphones. In some implementations, one or more of the microphones may be part of, or associated with, another device, such as a speaker of the speaker system, a smart audio device, etc. In some examples, the apparatus 700 may not include a microphone system 720. However, in some such implementations the apparatus 700 may nonetheless be configured to receive microphone data for one or more microphones in an audio environment via the interface system 710. In some such implementations, a cloud-based implementation of the apparatus 700 may be configured to receive microphone data, or a noise metric corresponding at least in part to the microphone data, from one or more microphones in an audio environment via the interface system 710.

According to some implementations, the apparatus 700 may include the optional loudspeaker system 725 shown in FIG. 7. The optional loudspeaker system 725 may include one or more loudspeakers, which also may be referred to herein as "speakers" or, more generally, as "audio reproduction transducers." In some examples (e.g., cloud-based implementations), the apparatus 700 may not include a loudspeaker system 725. In some implementations, the apparatus 700 may include headphones. Headphones may be connected or coupled to the apparatus 700 via a headphone jack or via a wireless connection (e.g., BLUETOOTH).

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. A method of performing denoising on audio signals, comprising:

determining, by a control system, an aggressiveness control parameter value that modulates a degree of speech preservation to be applied when denoising audio signals;

obtaining, by the control system, a training set of training samples, a training sample of the training set having a noisy audio signal and a target denoising mask; and training, by the control system, a machine learning model by:

(a) generating a frequency domain representation of the noisy audio signal corresponding to the training sample, (b) providing the frequency domain representation of the noisy audio signal to the machine learning model, (c) generating a predicted denoising mask based on an output of the machine learning model, (d) determining a loss representing an error of the predicted denoising mask relative to the target denoising mask corresponding to the training sample, (e) updating weights associated with the machine learning model, and (f) repeating (a)-(e) until a stopping criterion is reached, wherein the trained machine learning model is usable to take, as an input, a noisy test audio signal and generate a corresponding denoised test audio signal, and wherein the aggressiveness control parameter value is used for at least one of: 1) generating the frequency domain representation of the noisy audio signals included in the training set; 2) modifying the target denoising masks included in the training set; 3) Determining an architecture of the machine learning model prior to training the machine learning model; or 4) determining the loss, wherein the aggressiveness control parameter value is determined based on a type of audio content that is to be processed using the machine learning model.

2. The method of claim 1, wherein generating the frequency domain representation of the noisy audio signal comprises:

generating a spectrum of the noisy audio signal; and generating the frequency domain representation of the noisy audio signal by grouping bins of the spectrum of the noisy audio signal into a number of bands, wherein the number of bands is determined based on the aggressiveness control parameter value.

3. The method of claim 1, wherein modifying the target denoising masks included in the training set comprises applying a power function to a target denoising mask of the target denoising masks and wherein an exponent of the power function is determined based on the aggressiveness control parameter value.

4. The method of claim 1, wherein the machine learning model comprises a convolutional neural network (CNN), and wherein determining the architecture of the machine learning model comprises determining a filter size for convolutional blocks of the CNN based on the aggressiveness control parameter value.

5. The method of claim 1, wherein the machine learning model comprises a U-Net, and wherein determining the architecture of the machine learning model comprises determining a depth of the U-Net based on the aggressiveness control parameter value.

6. The method of claim 1, wherein determining the loss comprises applying a punishment weight to the error of the predicted denoising mask relative to the target denoising mask, and wherein the punishment weight is determined based at least in part on the aggressiveness control parameter value.

7. The method of claim 6, wherein the punishment weight is based at least in part on whether the corresponding noisy audio signal associated with the training sample comprises speech.

8. A method of performing denoising on audio signals, comprising:

determining, by a control system, an aggressiveness control parameter value that modulates a degree of speech preservation to be applied when denoising audio signals;

providing, by the control system, a frequency domain representation of a noisy audio signal to a trained model to generate a denoising mask;

modifying, by the control system, the denoising mask based at least in part on the aggressiveness control parameter value;

applying, by the control system, the modified denoising mask to the frequency domain representation of the noisy audio signal to obtain a denoised spectrum; and generating, by the control system, a time-domain representation of the denoised spectrum to generate denoised audio signal, wherein the aggressiveness control parameter value is determined based on a type of audio content that is to be processed using the trained model.

9. The method of claim 8, wherein modifying the denoising mask comprises applying a compressive function to the denoising mask, wherein a parameter associated with the compressive function is determined based on the aggressiveness control parameter value.

10. The method of claim 9, wherein the compressive function comprises a power function, and wherein an exponent of the power function is determined based on the aggressiveness control parameter value.

11. The method of claim 9, wherein the compressive function comprises an exponential function, and wherein a parameter of the exponential function is determined based on the aggressiveness control parameter value.

12. The method of claim 8, wherein modifying the denoising mask comprising performing smoothing of the denoising mask for a frame of the noisy audio signal based on a denoising mask generated for a previous frame of the noisy audio signal.

13. The method of claim 12, wherein performing the smoothing comprises multiplying the denoising mask for the frame of the noisy audio signal and a weighted version of the denoising mask generated for the previous frame of the noisy audio signal, wherein a weight used to generate the weighted version is determined based on the aggressiveness control parameter value.

14. The method of claim 12, wherein the denoising mask for the frame of the noisy audio signal comprises a time axis and a frequency axis, and wherein smoothing is performed with respect to the time axis.

15. The method of claim 12, wherein the denoising mask for the frame of the noisy audio signal comprises a time axis and a frequency axis, and wherein smoothing is performed with respect to the frequency axis.

16. The method of claim 8, wherein the aggressiveness control parameter value is determined based on whether a current frame of the noisy audio signal comprises speech.

17. The method of claim 8, further comprising causing the generated denoised audio signal to be presented via one or more loudspeakers or headphones.

18. An apparatus configured for implementing the method of claim 1.

19. One or more non-transitory media having software stored thereon, the software including instructions for controlling one or more devices to perform the method of claim 1.

* * * * *